Figures 1, 2:
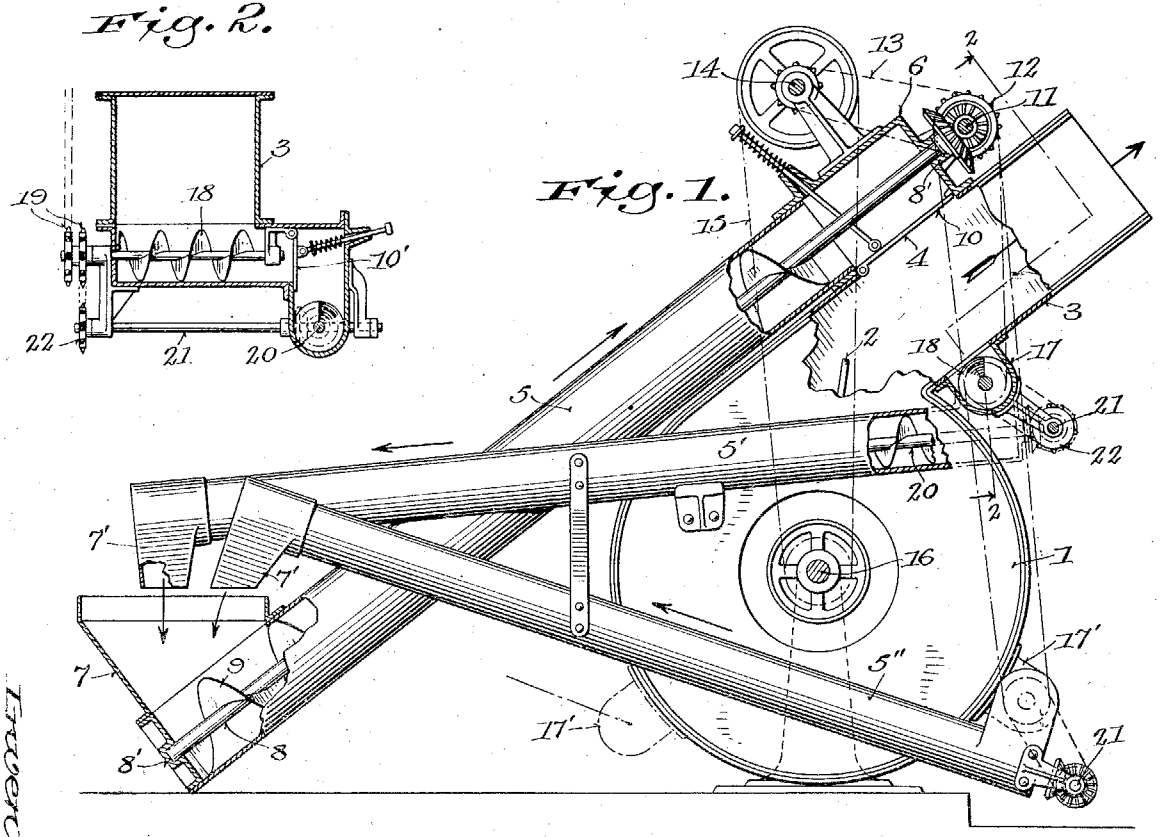

G. BERNERT.

CONVEYER.

APPLICATION FILED JAN. 20, 1920.

Reissued Apr. 20, 1920. 14,841.

Inventor
George Bernert
By Frank A. Ratcliffe
Attorney.

UNITED STATES PATENT OFFICE.

GEORGE BERNERT, OF MILWAUKEE, WISCONSIN, ASSIGNOR TO BERNERT MANUFACTURING COMPANY, OF MILWAUKEE, WISCONSIN, A CORPORATION OF SOUTH DAKOTA.

CONVEYER.

14,841. Specification of Reissued Letters Patent. Reissued Apr. 20, 1920.

Original No. 1,264,601, dated April 30, 1918, Serial No. 189,463, filed September 4, 1917. Application for reissue filed January 20, 1920. Serial No. 352,845.

*To all whom it may concern:*

Be it known that I, GEORGE BERNERT, a citizen of the United States, and resident of Milwaukee, in the county of Milwaukee and State of Wisconsin, have invented certain new and useful Improvements in Conveyers; and I do hereby declare that the following is a full, clear, and exact description thereof.

My invention relates to certain new and useful improvements in pneumatic conveyers of the type that are used in elevating grain and the like into elevators, cars and the like, and, is an improvement over the conveyer exemplified in Letters Patent No. 1,200,699, granted to Geo. and Jacob Bernert, October 10, 1916.

Under certain adverse conditions of operation, as, for instance, when there is a temporary let up in the power supplied to the blower fan of a conveyer mechanism of this character, there is a tendency for grain to accumulate in the fan casing thus choking the fan and necessitating cleaning up the fan casing before the conveying operation can be proceeded with. It is therefore the primary object of my invention to provide means adapted to collect grain tending to accumulate in the fan casing whereby to remove said grain from the air pressure space of the fan casing and convey it out, thus preventing the possibility of choking the fan incidental to temporary reductions of power or other adverse conditions of operation.

It is further my object to provide arrangement whereby, as grain tends to accumulate in the fan casing, said grain is continuously conveyed from the air pressure space for discharge at a suitable point so that the grain collecting means thus provided has sufficient capacity to meet any general conditions which might occur tending to choke the fan with grain.

A still further object resides in the provision of an arrangement whereby, should extreme or persistent adverse conditions occur tending to accumulate grain in the fan casing, such grain may be returned to the supply hopper of the conveying mechanism for subsequent feeding into the air pressure space to be conveyed to its proper destination.

With the above and other objects in view which will appear as the description proceeds my invention resides in the novel construction, combination and arrangement of parts substantially as hereinafter described and particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, in which:

Figure 1 is a side elevational view of a pneumatic grain conveyer with my present invention embodied therein, with parts broken away and in section to more clearly define structural details, and Fig. 2 is a transverse sectional view through the passage chute and one of the collector pockets as indicated by the line 2—2 of Fig. 1.

Referring to the accompanying drawings by numerals it will be seen that the conveyer proper comprises in its general organization, a fan casing 1 having a fan or blower 2 therein, a trunk 3 being in communication with the casing 1 and projecting obliquely upwardly directly therefrom to inclose an air pressure space in conjunction therewith. The trunk 3 at the point above the junction of said trunk and the casing 1 is provided with a side opening 4 for the admission of grain or other material. A conveyer drum 5 is provided having its upper end secured in a casing 6 secured to the trunk 3 and communicating with the opening 4. At its lower end the drum is provided with a horizontally disposed hopper 7, the extreme lower end of the drum being closed. The conveyer shaft 8 is disposed centrally in the drum 5 and has its ends journaled in bearings 8′ formed at the lower closed end of the drum and the upper end of the casing 6. A screw conveyer 9 is carried by shaft 8, the conveyer extending to the lower end of the drum 5 in position to receive the material that is to be elevated directly from the hopper 7 and then terminating just below the opening 4 connecting casing 6 and trunk 3, and in order that the opening 4 may be normally closed, a spring held valve 10 is hinged to one side wall of the opening 4, the valve being of the usual or any convenient type.

The feed of the material by the conveyer 9 is upward and the material is discharged into the upper portion of the trunk above the fan or blower, and is forced upward by the air from the blower. This type of conveyer is of great utility in that the material is handled, or conveyed in an upward direction, thereby providing means whereby material may be quickly and efficiently transferred from the basement of an elevator into a car, or transferred from a wagon or other vehicle into the upper portion of an elevator.

Any convenient or desired method may be adopted for simultaneously operating the conveyer 9 and blower 2, as for example, the conveyer shaft has been shown projecting beyond the top of casing 6 and equipped with a gear that meshes with a gear on a shaft 11, the shaft 11 also carrying the sprocket 12 having a chain connection 13 with an upper shaft 14 carried by suitable journals on the casing 6, shaft 14 also having a suitable connection 15 with the shaft 16 of the blower.

All of the foregoing described construction is similar, except for a few minor structural details, to that form of conveyer illustrated in the aforementioned Patent No. 1200699 and what is especially desired to be protected by Letters Patent is the novel means I employ for preventing the accumulation of material in the fan casing 1 as hereinafter described.

Upon stopping or starting of the blower fan, in case the grain supply is not cut off in advance, or when the blast decreases in force through whatever cause, grain then in the pipe on to its way to destination, on account of the reduced air pressure, will stop its travel and of course fall to the bottom. As for instance in elevating it would drop back or down into the fan casing and if conveyed on a level it would drop to the bottom of the pipe. This together with a supply of grain still feeding into the fan or pipe will in every case result in choking the fan and cutting off completely the air pressure which in turn means a clean out of the fan and pipe. For collecting this material and preventing its accumulation in the casing, a collector pocket 17 is provided at the bottom of the trunk 3 adjacent the fan casing and communicating therewith just above the casing as best shown in Fig. 1, however, it is understood that in some cases as for instance if the material is fed through the fan, this collector or pocket may be attached so as to communicate anywhere with the fan casing.

This pocket 17 is extended from the air trunk in the form of a closed passageway, and this passageway is of sufficient length to accommodate a body of grain sufficient to prevent free escape of air from the trunk 3 when the outer end of the passageway is open, said outer end of the passageway being yieldably closed in the present instance by a spring-urged valve 10′ urged to seat against the outer end of the passageway. This pocket 17 has journaled therein the shaft of a screw conveyer 18 having one end terminating outward of the pocket and carrying thereon a pair of sprockets 19 one of which has a chain connection with shaft 11 whereby the same is revolved. The other end of the shaft terminates in the pocket adjacent the closed passageway thereof, and under extreme or persistent conditions of adverse operation, the passageway of the pocket may be arranged to discharge into a conveyer drum 5′ which has its discharge end 7′ disposed over the hopper 7 for discharging therein. This conveyer drum 5′ is similar to drum 5 having journaled therein the shaft of a screw conveyer 20 having the conveyer shaft outward of its intake end and having thereon a gear meshing with a gear carried by a shaft 21 carrying a sprocket 22 connected with the other end of said sprockets by a suitable chain connection whereby the same is revolved.

Thus it will be seen that the simultaneous operation of all the parts is obtained by reason of the several conveyers and blower fan being connected with the driven shaft 11.

If desired the collector pocket may be located as to communicate directly with the fan casing 1 as indicated at 17′, or both collectors may be utilized as exemplified in Fig. 1, and as the construction of collector pocket 17 and its conveyer drum 5′ is similar to the collector pocket 17′ and drum 5″, the aforegoing description will suffice for both. In locating the collector pocket on the fan casing 1, any desired location may be utilized.

Under normal conditions the return conveyers 5 and 5′ would be entirely dispensed with, since the volume of grain collected by the pocket incidental to temporary let-ups of power, would not be sufficient to require a continuous conveying mechanism for returning the grain to the loading hopper, and the grain would be collected by a basket or other receptacle disposed under the discharge end of the closed passageway portion of the collector pocket. It will also be observed that the closed passageway portion of said collector pocket may be of considerably greater length than shown in the drawings whereby to further reduce the tendency of an escape of air therethrough. The mouth of the collector pocket is entirely open, it being understood by the term "entirely open"

that the mouth of the pocket is freely adapted to receive therethrough the granular material primarily intended to be conveyed through the duct, when adverse conditions are such as to permit the material to pass into the pocket.

While I have described a preferred embodiment of my invention, it will be appreciated that various changes and modifications of structure may be employed to meet different conditions of use and manufacture without departing in any manner from the spirit of my invention as defined by the appended claims.

As will be obvious, my invention also serves to catch any foreign matter which may be in the grain, such as stones or the like, as the same will, by reason of its weight, fall downwardly and be received by the collector pocket.

What I claim as my invention is:

1. A device for preventing clogging of the air-pressure space of a pneumatic grain conveyer by material introduced therein to be conveyed, comprising the combination with a casing, a blower fan therein and a trunk extending from the casing and inclosing an air-pressure space in conjunction therewith, of a pocket having free communication with said space to receive grain tending to accumulate in the pressure space, the mouth of said pocket being entirely open, said pocket being provided with an inclosed extension in communication therewith, and a movable closure for the outer end of the pocket extension.

2. A device for preventing clogging of the air pressure space of a pneumatic grain conveyer by material introduced therein to be conveyed, comprising the combination with a casing, a blower fan therein and a trunk extending from the casing and inclosing an air-pressure space in conjunction therewith, of a pocket having free communication with said space to receive grain tending to accumulate in the pressure space, the mouth of said pocket being entirely open, said pocket being provided with an inclosed extension in communication therewith, and means for closing the outer end of the pocket extension yieldable upon outward pressure of grain in said pocket extension.

3. A device for preventing clogging of the air-pressure space of a pneumatic grain conveyer by material introduced therein to be conveyed, comprising the combination with a casing, a blower fan therein and a trunk extending from the casing and inclosing an air-pressure space in conjunction therewith, of a pocket having free communication with said space to receive grain tending to accumulate in the pressure space, the mouth of said pocket being entirely open, said pocket being provided with an inclosed extension in communication therewith, a yieldable valve controlling the outlet of grain from the pocket, and a conveyer in the pocket for conveying grain outwardly of the device by pressure of grain in the pocket extension against said yieldable valve.

4. In a pneumatic grain conveyer a casing, a blower fan in the casing, an air trunk extending obliquely upward directly from the casing, means for feeding grain into the top of said trunk and means communicating with the bottom of the trunk for receiving grain tending to drop into the fan casing, said means having sufficient capacity for grain to prevent clogging of the fan casing by grain fed into the trunk by said feeding means.

5. In a pneumatic grain conveyer, a casing, a blower fan therein, a trunk leading therefrom, a supply hopper, a conveyer drum having its intake end communicating with the supply hopper and its discharge end communicating with said trunk, a collector pocket for receiving grain dropped upon the entrance of grain from the conveyer drum to said trunk, a conveyer leading from the collector pocket back to said supply hopper, and means disposed between said collector pocket and said conveyer to prevent the escape therethrough of air generated by said blower fan.

In testimony that I claim the foregoing I have hereunto set my hand at Milwaukee, in the county of Milwaukee and State of Wisconsin.

GEORGE BERNERT.